US012087297B2

(12) United States Patent
Sharifi et al.

(10) Patent No.: US 12,087,297 B2
(45) Date of Patent: *Sep. 10, 2024

(54) VOICE FILTERING OTHER SPEAKERS FROM CALLS AND AUDIO MESSAGES

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 17/930,822

(22) Filed: Sep. 9, 2022

(65) Prior Publication Data

US 2023/0005480 A1 Jan. 5, 2023

Related U.S. Application Data

(63) Continuation of application No. 17/086,296, filed on Oct. 30, 2020, now Pat. No. 11,462,219.

(51) Int. Cl.
*G10L 15/00* (2013.01)
*G10L 15/02* (2006.01)
(Continued)

(52) U.S. Cl.
CPC .............. *G10L 15/22* (2013.01); *G10L 15/02* (2013.01); *G10L 21/0208* (2013.01);
(Continued)

(58) Field of Classification Search
CPC ......... G10L 15/07; G10L 15/20; G10L 15/22; G10L 15/26; G10L 15/30; G10L 15/02;
(Continued)

(56) References Cited

U.S. PATENT DOCUMENTS 10,553,235 B2    2/2020   Bryan et al.
10,991,379 B2 *  4/2021   Hijazi ............... H04N 21/4394
(Continued)

FOREIGN PATENT DOCUMENTS

EP    3010017 A1    4/2016

OTHER PUBLICATIONS

International Search Report and Written Opinion, related to Application No. PCT/US2021/056718, dated Feb. 16, 2022.

*Primary Examiner* — Vu B Hang
(74) *Attorney, Agent, or Firm* — Honigman LLP; Brett A. Krueger; Grant Griffith

(57) ABSTRACT

A method includes receiving a first instance of raw audio data corresponding to a voice-based command and receiving a second instance of the raw audio data corresponding to an utterance of audible contents for an audio-based communication spoken by a user. When a voice filtering recognition routine determines to activate voice filtering for at least the voice of the user, the method also includes obtaining a respective speaker embedding of the user and processing, using the respective speaker embedding, the second instance of the raw audio data to generate enhanced audio data for the audio-based communication that isolates the utterance of the audible contents spoken by the user and excludes at least a portion of the one or more additional sounds that are not spoken by the user The method also includes executing.

20 Claims, 6 Drawing Sheets

(51) Int. Cl.
  *G10L 15/22* (2006.01)
  *G10L 21/0208* (2013.01)
  *G10L 21/0272* (2013.01)
  *G10L 25/78* (2013.01)
  *G10L 25/87* (2013.01)

(52) U.S. Cl.
  CPC .......... *G10L 21/0272* (2013.01); *G10L 25/78* (2013.01); *G10L 25/87* (2013.01)

(58) Field of Classification Search
  CPC ............... G10L 15/063; G10L 21/0208; G10L 21/0272; G10L 25/87; G10L 15/08; G10L 19/00; G10L 19/005; G10L 15/16; G10L 25/27; G10L 25/30
  See application file for complete search history.

(56) References Cited

U.S. PATENT DOCUMENTS 11,462,219 B2 * 10/2022 Sharifi .................. G10L 21/028
2018/0033428 A1    2/2018 Kim et al.

\* cited by examiner

VOICE FILTERING OTHER SPEAKERS FROM CALLS AND AUDIO MESSAGES

CROSS REFERENCE TO RELATED APPLICATIONS

This U.S. patent application is a continuation of, and claims priority under 35 U.S.C. § 120 from, U.S. patent application Ser. No. 17/086,296, filed on Aug. 29, 2022. The disclosure of this prior application is considered part of the disclosure of this application and is hereby incorporated by reference in its entirety.

TECHNICAL FIELD

This disclosure relates to voice filtering other speakers from calls and audio messages.

BACKGROUND

A speech-enabled environment permits a user to only speak a query or command out loud and an automated assistant will field and answer the query and/or cause the command to be performed. A speech-enabled environment (e.g., home, workplace, school, etc.) can be implemented using a network of connected microphone devices distributed throughout various rooms and/or areas of the environment. As such, a connected microphone device may implement an automated assistant and a user may interact with the automated assistant by providing spoken utterances that the automated assistant may respond to by performing an action, controlling another device, and/or providing responsive content (e.g., visual and/or audible natural language output).

An automated assistant can convert audio data, corresponding to a spoken utterance of a user, into corresponding text (or other semantic representation). For instance, the automated assistant can include a speech recognition engine that attempts to recognize various characteristics of the spoken utterance, such as sounds produced (e.g., phonemes), an order of the pronounced sounds, rhythm of speech, intonation, etc., and then identify text words or phrases represented by these characteristics. Automated assistants may employ voice filtering techniques as a pre-processing step performed on an utterance spoken by a user to help focus the speech recognition engine on the voice of the user that spoke the utterance.

SUMMARY

One aspect of the disclosure provides a method for activating voice filtering in an audio-based communication. The method includes receiving, at data processing hardware, a first instance of raw audio data corresponding to a voice-based command for an assistant-enabled device to facilitate an audio-based communication between a user of the assistant-enabled device and a recipient. The voice-based command is spoken by the user and captured by the assistant-enabled device. The method also includes receiving, at the data processing hardware, a second instance of the raw audio data corresponding to an utterance of audible contents for the audio-based communication spoken by the user and captured by the assistant-enabled device. The second instance of the raw audio data captures one or more additional sounds that are not spoken by the user. The method also includes executing, by the data processing hardware, a voice filtering recognition routine to determine whether to activate voice filtering for at least a voice of the user in the audio-based communication based on the first instance of the raw audio data. When the voice filtering recognition routine determines to activate voice filtering for at least the voice of the user, the method includes: obtaining, by the data processing hardware, a respective speaker embedding of the user that represents voice characteristics for the user; and processing, by the data processing hardware, using the respective speaker embedding of the user, the second instance of the raw audio data to generate enhanced audio data for the audio-based communication that isolates the utterance of the audible contents spoken by the user and excludes at least a portion of the one or more additional sounds that are not spoken by the user. The method also includes transmitting, by the data processing hardware, the enhanced audio data to a recipient device associated with the recipient. The enhanced audio data when received by the recipient device, causes the recipient device to audibly output the utterance of the audible contents spoken by the user.

Another aspect of the disclosure provides a system for activating voice filtering in an audio-based communication. The system includes data processing hardware and memory hardware in communication with the data processing hardware. The memory hardware stores instructions that when executed on the data processing hardware cause the data processing hardware to perform operations that include receiving a first instance of raw audio data corresponding to a voice-based command for an assistant-enabled device to facilitate an audio-based communication between a user of the assistant-enabled device and a recipient. The voice-based command is spoken by the user and captured by the assistant-enabled device. The operations also include receiving a second instance of the raw audio data corresponding to an utterance of audible contents for the audio-based communication spoken by the user and captured by the assistant-enabled device. The second instance of the raw audio data captures one or more additional sounds that are not spoken by the user. The operations also include executing a voice filtering recognition routine to determine whether to activate voice filtering for at least a voice of the user in the audio-based communication based on the first instance of the raw audio data. When the voice filtering recognition routine determines to activate voice filtering for at least the voice of the user, the operations also include: obtaining a respective speaker embedding of the user that represents voice characteristics for the user; and processing, using the respective speaker embedding of the user, the second instance of the raw audio data to generate enhanced audio data for the audio-based communication that isolates the utterance of the audible contents spoken by the user and excludes at least a portion of the one or more additional sounds that are not spoken by the user. The operations also include transmitting the enhanced audio data to a recipient device associated with the recipient. The enhanced audio data when received by the recipient device, causes the recipient device to audibly output the utterance of the audible contents spoken by the user.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A user may use an automated assistant for transmitting audio communications, such as sending/receiving audio messages and making phone calls (e.g., audio and/or visual), with a remote recipient. When the user is in a noisy environment (e.g., in a busy place, within an automobile, or in a noisy household), the recipient of the audio communication may have difficult hearing or understanding the content of the audio communication due to high background noise levels.

Implementations herein are directed toward applying voice filtering to focus on one or more voices in an audio-based communication transmitted to (or received from) another user by removing unwanted background noise from the audio communication. When audio data captured by an assistant-enabled device includes an utterance spoken by a user that conveys the audible content of the audio-based communication as well as unwanted noise, applying voice filtering can generate an enhanced version of the audio data by removing the unwanted background noise so that the end recipient receives a clear and consistent audio-based communication. As used herein, an audio-based communication may refer to an audio message, a phone call, a video call (e.g., an audio-video call), or broadcasted audio. For instance, the assistant-enabled device could record the content of an audio message spoken by a user and then send the audio message via a messaging or email platform to the recipient. Voice filtering may be applied to remove unwanted background noise from the audio data conveying the audio message at the assistant-enabled device, at an intermediate cloud-based node while the audio message is in route to the recipient, or at a recipient client device once the audio message is received. As such, when the recipient wishes to playback the audio message, the recipient client device audibly outputs the enhanced version of the audio message that does not include the unwanted background noise that was initially captured when the user was speaking the utterance conveying the content of the audio message. Likewise, the assistant-enabled device could facilitate a phone call and apply voice filtering in real-time to remove unwanted background noise. As with the audio message, the voice filtering can be applied to remove the unwanted noise from the audio data of the phone call locally at the assistant-enabled device or at any point along the communication path to the recipient device.

Figure 1A:
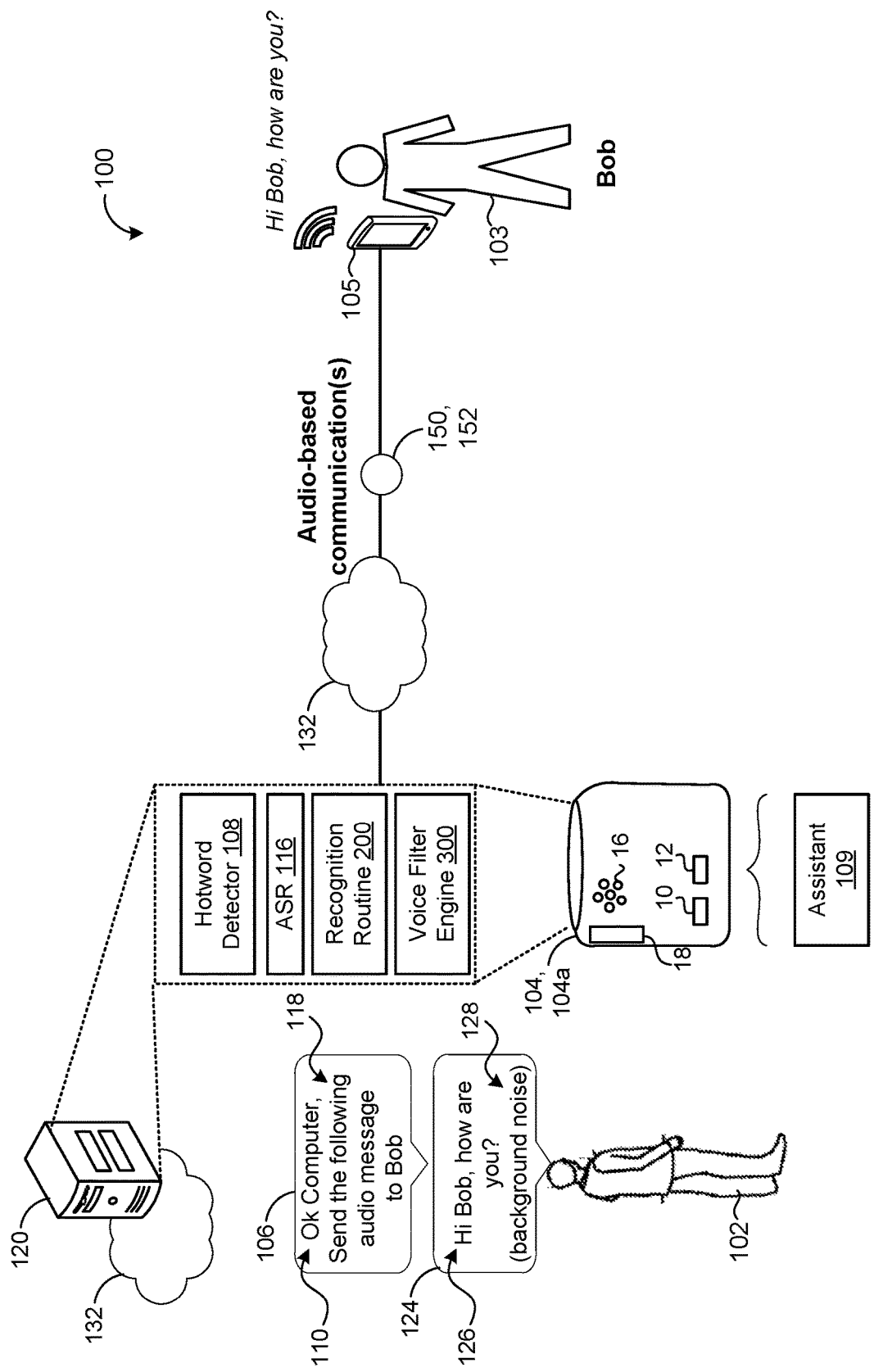
FIGS. 1A and 1B are example systems for activating voice filtering to focus on one or more voices in an audio-based communication.
Figure 1B:
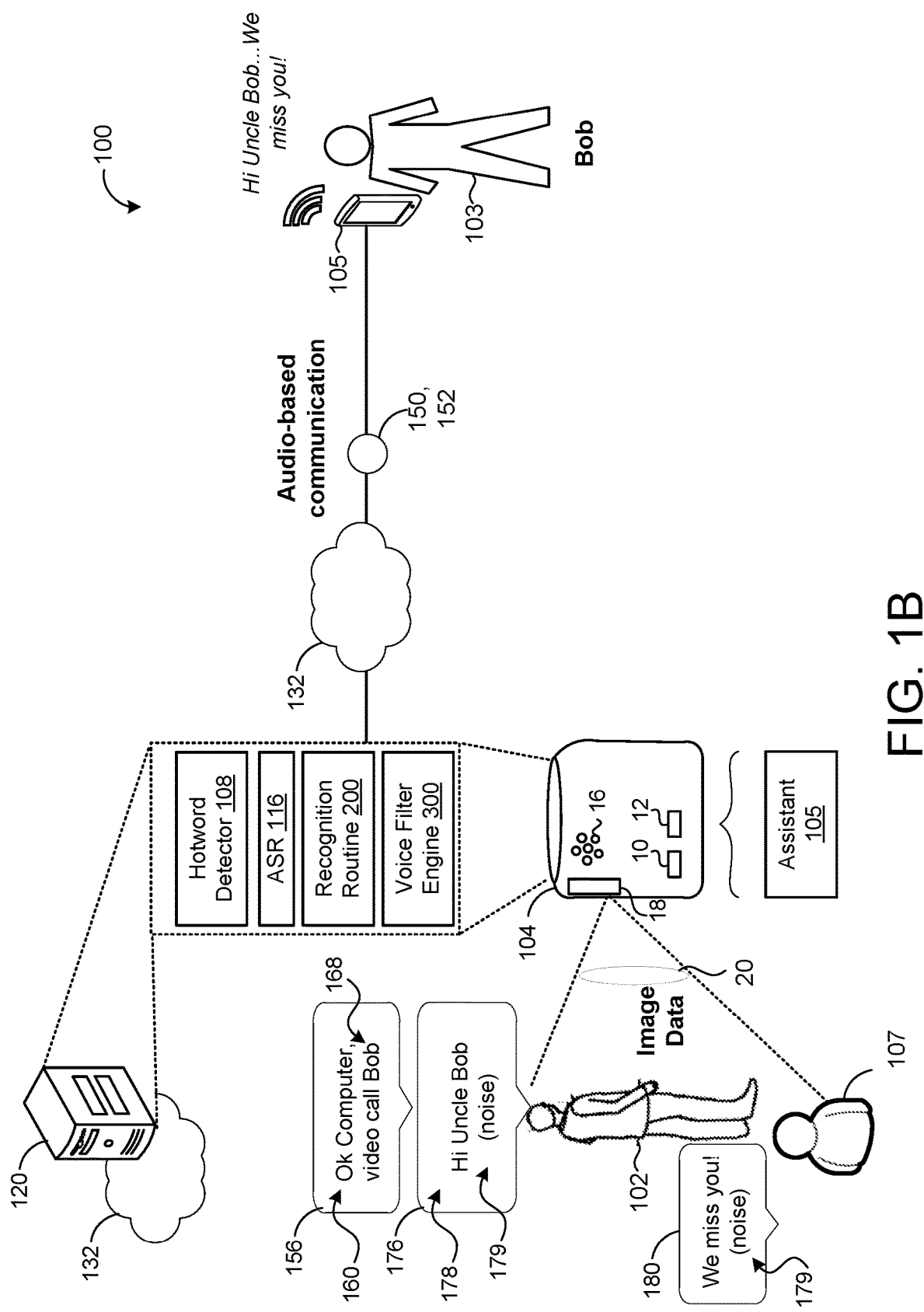

FIGS. 1A and 1B illustrate an example system 100 for voice filtering to focus on at least a voice of a user 102 in an audio-based communication 150 transmitted to (or received from) another user 103 by removing unwanted background noise from the audio-based communication 150. The system 100 includes an assistant-enabled device (AED) 104 executing a digital assistant 109 that the user 102 may interact with through speech. In the example shown, the AED 104 corresponds to a smart speaker. However, the AED 104 can include other computing devices, such as, without limitation, a smart phone, tablet, smart display, desktop/laptop, smart watch, smart appliance, headphones, or vehicle infotainment device. The AED 104 includes data processing hardware 10 and memory hardware 12 storing instructions that when executed on the data processing hardware 10 cause the data processing hardware 10 to perform operations. The AED 104 includes an array of one or more microphones 16 configured to capture acoustic sounds such as speech directed toward the AED 104. The AED 104 may also include, or be in communication with, an audio output device (e.g., speaker) 16 that may output audio such as audible content from an audio-based communication 150 received from the other user 103 and/or synthesized speech from the digital assistant 109.

FIG. 1A shows the user 102 speaking a first utterance 106, "Ok Computer, send the following audio message to Bob" in the vicinity of the AED 104. The microphone 16 of the AED 104 receives the utterance 106 and processes the raw audio data that corresponds to the first utterance 106. The initial processing of the audio data may involve filtering the audio data and converting the audio data from an analog signal to a digital signal. As the AED 104 processes the audio data, the AED may store the audio data in a buffer of the memory hardware 12 for additional processing. With the audio data in the buffer, the AED 104 may use a hotword detector 108 to detect whether the raw audio data includes a hotword 110. The hotword detector 108 is configured to identify hotwords that are included in the audio data without performing speech recognition on the audio data. In the example shown, the hotword detector 108 may determine that the utterance 106 "Ok computer, send the following audio message to Bob" includes the hotword 110 "ok computer" if the hotword detector 108 detects acoustic features in the audio data that are characteristic of the hotword 110. The acoustic features may be mel-frequency cepstral coefficients (MFCCs) that are representations of short-term power spectrums of the utterance 106 or may be mel-scale filterbank energies for the utterance 106.

When the hotword detector 108 determines that the audio data that corresponds to the utterance 106 includes the hotword 110, the AED 104 may trigger a wake-up process to initiate speech recognition on the audio data that corresponds to the utterance 106. For example, an automated speech recognizer (ASR) 116 running on the AED 104 may perform speech recognition and semantic interpretation on the audio data that corresponds to the utterance 106. The ASR 116 may process at least the portion of the raw audio data that follows the hotword 110 to generate a speech recognition result for the received raw audio data and perform semantic interpretation on the speech recognition result to determine that the utterance 106 includes a voice-based command 118 to facilitate an audio-based communication 150 between the user 102 and the recipient 103. In this example, the ASR 116 may process a first instance of raw audio data for "send the following audio message to Bob" and identify the voice-based command 118.

In some implementations, the ASR 116 is located on a server 120 in addition to, or in lieu of, the AED 104. Upon the hotword detector 108 triggering the AED 104 to wake-up responsive to detecting the hotword 110 in the utterance 106, the AED 104 may transmit the first instance of the raw audio data corresponding to the utterance 106 to the server 120 via a network 132. The AED 104 may transmit the portion of the audio data that includes the hotword 110 for the server 120 to confirm the presence of the hotword 110. Alternatively, the AED 104 may transmit only the portion of the audio data that corresponds to the portion of the utterance 106 after the hotword 110 to the server 120. The server 120 executes the ASR 116 to perform speech recognition and returns a speech recognition result (e.g., transcription) of the audio data to the AED 104. In turn, the AED 104 identifies the words in the utterance 106, and the AED 104 performs semantic interpretation to identify the voice command 118. The AED 104 (and/or the server 120) may identify the voice-based command 118 for the digital assistant 109 to facilitate the audio-based communication 150 of an audible message through the network 132 from the AED 104 to a recipient device 105 associated with the recipient 103. Thereafter, the AED 104 leaves the microphone 16 open and receives a second instance of the raw audio data corresponding to an utterance 124 of audible contents 126 for the audio message 150 spoken by the user and captured by the AED 104. In the example shown, the utterance 124 of audible contents 126 includes "Hi Bob, how are you?" The second instance of the raw audio data also captures one or more additional sounds 128, such as background noise, not spoken by the user 102.

Before or after receiving the second instance of the raw audio data corresponding to the utterance of the audible contents, the AED 104 executes a voice filtering recognition routine ('routine') 200 to determine whether to activate voice filtering for at least a voice of the user 102 in the audio-based communication (e.g., the audio message) 150 based on the first instance of the raw audio data corresponding to the voice-based command 118. When the routine 200 determines not to activate voice filtering, the AED 104 will simply transmit the second instance of the raw audio data corresponding to the utterance 124 of audible contents 126 of the audible message 155 to the recipient device 105. Here, the recipient device 105 will simply playback the utterance 124 of audible contents 126 of the utterance 124 of audible contents 126 includes "Hi Bob, how are you?" as well as any background noise captured by the second instance of raw audio data to Bob the recipient 103. When the routine 200 determines to activate voice filtering, the AED 104 uses a voice filter engine 300 to generate enhanced audio data 152 for the audio-based communication 150 that isolates the utterance 124 of the audible contents 126 spoken by the user and excludes at least a portion of the one or more additional sounds that are not spoken by the user 102. That is, when routine 200 determines to activate voice filtering for other individuals in addition to the user 102 and when at least a portion of the one or more additional sounds include an additional utterance of audible contents spoken by another individual, then the voice filter engine 300 will generate enhanced audio data 152 that does not exclude the additional utterance of audible contents. Otherwise, if the routine 200 determines to activate voice filtering for only the user 102, then the voice filter engine 300 will generate enhanced audio data 152 that isolates only the voice of the user 102 and excludes any other sounds not spoken by the user 102 that are captured by the second instance of raw audio data.

While described in greater detail below with reference to FIG. 3, when the routine 200 determines to activate voice filtering for the voice of the user 102, the AED 104 (or server 120) instructs the voice filtering engine to obtain a respective speaker embedding 318 (FIG. 3) of the user 102 that represents the voice characteristics for the user, and use the respective speaker embedding to process the second instance of the raw audio data corresponding to the utterance 124 of the audible contents 126 to generate the enhanced audio data 152 for the audio message 150 that isolates the utterance 124 of the audible contents 126 spoken by the user 102 and excludes the one or more additional sounds such as background noise 128 not spoken by the user 102. FIG. 1A shows the AED 104 (or the server 120) transmitting the enhanced audio data 152 for the audio message 150 to the recipient device 105 of the recipient 103, whereby the recipient device 105 audibly outputs the enhanced audio data 152 to allow the recipient 103 to hear the utterance 124 of audible contents 126 "Hi Bob, how are you?" spoken by the user 102 without hearing the background noise 128 that was originally captured in the environment of the AED 104.

In some examples, the audio message 150 is not transmitted to the recipient device 105, but instead stored on the AED 104 for the intended recipient to retrieve at a later time. In these examples, the recipient 103 may invoke the AED 104 to audibly playback the recorded audio message 150 with the enhanced audio data 152 generated by the voice filter engine 300 to isolate the voice of the user 102 conveying the audible contents of the audio message 150. In other examples, the functionality of the routine 200 and voice filter engine 300 may execute on the recipient device 105 such that the recipient device 105 only receives raw audio data in the audio-based communication 150. In these examples, the recipient device 105 may determine to activate voice filtering for at least the voice of the sender 102 and process the raw audio data to isolate the voice of the sender 102 conveying the audible contents of the audio-based communication 150. In some additional examples, the AED 104 sends both raw audio data 301 (FIG. 3) and the enhanced audio data 152 to the recipient device 105 to permit the recipient 103 to select either playback of the raw audio data to listen to audible contents of the audio-based communication without voice filtering or playback of the enhanced audio data 152 to listen to the audible contents of the audio-based communication 150 with voice filtering activated for at least the voice of the user 102. Moreover, the AED 104 could send multiple versions of enhanced audio data 152 each associated with voice filtering applied to a different combination of voices. As such, the recipient 103 may toggle between playing back different versions of the enhanced audio data 152 to listen to different combinations of isolated voices.

The recipient device 105 and/or the AED 104 may display in a graphical user interface (GUI) a graphical indicator indicating whether or not voice filtering is currently activated for at least the voice of the user 102. The GUI may further render one or more controls for activating/deactivating voice filtering for at least the voice of the user. Here, the user may select the controls to select between playback of the raw audio data to listen to audible contents of the audio-based communication without voice filtering and playback of the enhanced audio data 152 to listen to the audible contents of the audio-based communication 150 with voice filtering activated for at least the voice of the user 102. User input indications indicating selection of a control may be provided as user feedback 315 for training a classification model 210 of the voice filtering recognition routine 200 discussed below. The AED 104 may also include a physical button that may be selected to activate or deactivate voice filtering. The recipient device, however, would not be afforded these types of controls for activating or deactivating voice filtering.

Figure 2:
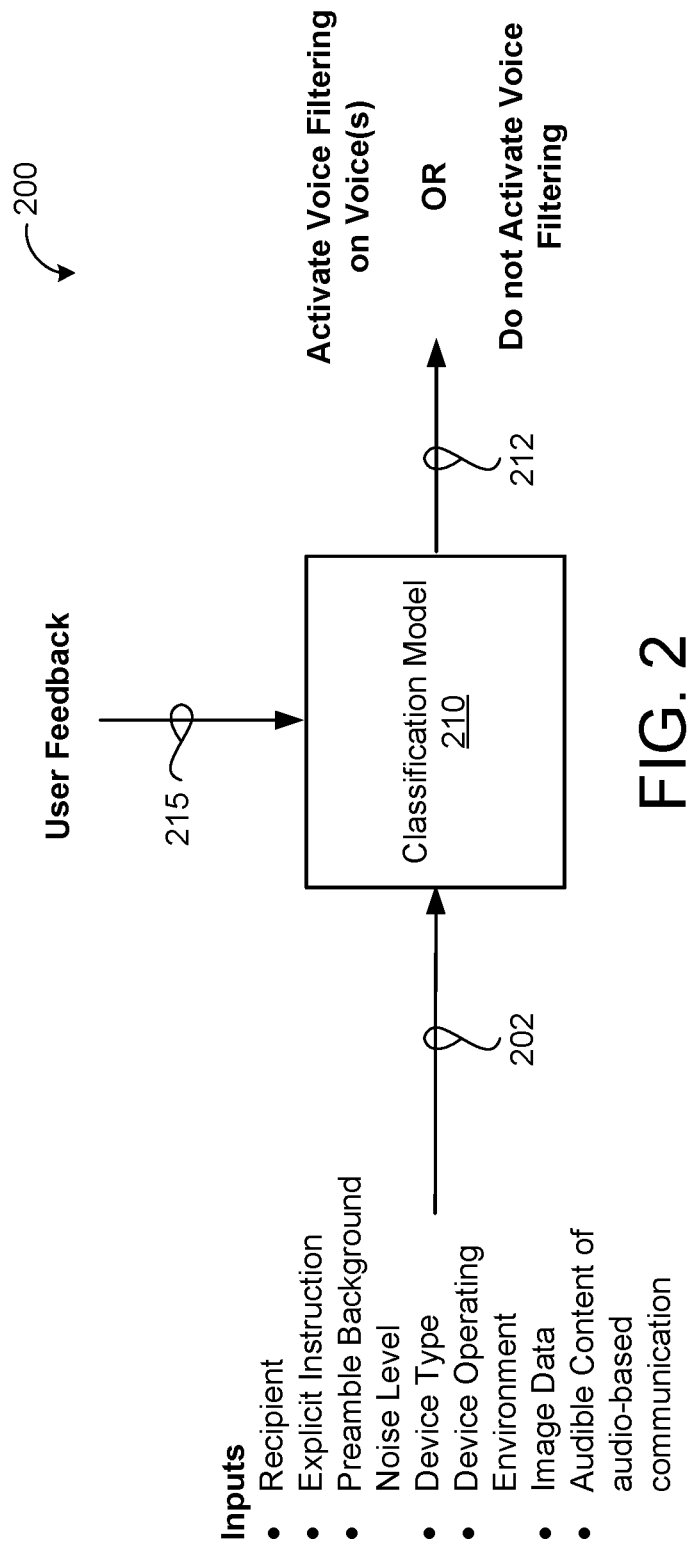
FIG. 2 is an example voice filtering recognition routine.

FIG. 2 shows an example of the voice filtering recognition routine 200 executing on the AED 104 (or the server 120) for determining whether to activate voice filtering for at least a voice of the user 102 in the audio-based communication 150. Executing the voice filtering recognition routine 200 may include executing a classification model 210 configured to receive contextual inputs 202 associated with the audio-based communication 150, and generate, as output, a classification result 212 that indicates one of: to activate voice filtering for one or more voices in the audio-based communication; or to not activate voice filtering on any voices. When the classification result 212 based on the contextual inputs 202 is to activate voice filtering on one or more voices, the result 212 may specify each of the one or more voices.

In some examples, one or more of the contextual inputs 202 are derived from performing semantic interpretation on the speech recognition result for the first instance of the raw audio data corresponding to the voice-based command 118. Here, the ASR 116 (FIGS. 1A and 1B) may generate, and perform semantic interpretation on, the speech recognition result for the first instance of the raw audio data corresponding to the voice-based command 118 to identify/determine one or more of the contextual inputs 202 such as the recipient 103 of the audio-based communication 150. These contextual inputs 202 may include an identity of the recipient 103 of the audio-based communication 150 and/or an explicit instruction to activate the voice filtering for at least the voice of the user 102 in the audio-based communication. The classification model 210 may determine whether the identified recipient 103 includes a particular recipient type indicating that activating the voice filtering for voices in the audio-based communication is appropriate. For instance, when the identified recipient 103 includes a business, the classification model 210 may determine to activate voice filtering. On the other hand, when the identified recipient 103 includes a friend or family member of the user 102, the classification model 210 may determine to not activate voice filtering. In additional examples, when the voice-based command 118 includes an explicit instruction to activate voice filtering, the classification model 210 determines to activate voice filtering for at least the voice of the user. For example, a voice-based command 118 that says "call the plumber and cancel out the background noise" includes the explicit command to activate voice filtering and identifies a recipient (e.g., plumber) that includes a particular recipient type where voice filtering may be appropriate In another example, the voice-based command 118 that says "call mom so that the kids can speak with her" identifies that the "kids" are also participants in the audio-based communication and identifies a recipient (e.g., mom) that includes a particular recipient type where voice filtering may not be appropriate. In this example, the classification result 212 may be to activate voice filtering for the voice of each kid of the user 102 during the ensuing audio-based communication (e.g., phone call) between the kids and mom.

In additional examples, the AED 104 (or the server 120) processes the first instance of the raw audio data (e.g., the utterance 106 in FIG. 1A or the utterance 156 in FIG. 1B) in other ways to derive contextual inputs 202 that may be meaningful for the routine 200 to determine whether or not activating voice filtering is appropriate. For example, when the first instance of raw audio data includes preamble audio and/or a hotword 110, 160 preceding the voice command 118, 168, the routine 200 may extract audio features from the preamble audio and/or hotword to determine a background noise level of an environment of the AED 104 at the time the voice command was initiated. Here, the background noise level may serve as a contextual input 202 fed to the classification model 210 that indicates a likelihood that the ensuing second instance of raw audio data corresponding to the utterance of audible contents for the audio-based communication 150 will capture background noise. For example, higher background noise levels may indicate that activating voice filtering is more appropriate than if the background noise level was low.

Similarly, a contextual input 202 could include a location of the AED 104. In this instance, an AED 104 located in a home or office environment of the user 102 may be less likely to activate voice filtering than if the AED 104 were located at a public place such as a train station. The classification model 210 may also consider a type of the AED 104 as a contextual input when determining whether to activate voice filtering. Here, some particular types of AEDs may be more suitable for activating voice filtering than others. For instance, a shared AED 104 such as a smart speaker in a multi-user environment may be more suitable for activating voice filtering than a personal AED 104 such a phone since the shared AED 104 is more likely to capture background sounds than a phone held close to the mouth of the user 102.

Referring to FIGS. 1B and 2, in some implementations, one of the contextual inputs 202 includes image data 20 (FIG. 1B) captured by an image capture device 18 implemented at the AED 104 or otherwise in communication with the AED 104. For example, FIG. 1B shows the AED 104 capturing a first instance of raw audio data for an utterance 156 spoken by the user that corresponds to a voice command 168 for the AED 104 (i.e., via the digital assistant 109 executing on the AED 104) to facilitate a video call 150 as an audio-based communication between the user 102 and the recipient Bob 103. The AED 104 may include a tablet or smart display configured for voice calls, and as such, the image capture device 18 may capture image data 20 indicating that at least the user 102 is in the image frame, and thus, participating in the video call. FIG. 1B shows the image data 20 capturing both the user 102 and another individual 107, e.g., the user's 102 daughter. The AED 104 receives the first instance of raw audio data for the utterance 156 that captures the user 102 speaking "Ok Computer, video call Bob" in which a hotword 160, "Ok computer", precedes the voice command 168, "video call Bob". Up until this point, the contextual inputs 202 fed to the classification model 210 of the voice filtering recognition routine 200 may include the recipient "Bob" identified as a brother of the user, the type of AED 104 such as a shared smart display configured for video calls, an environment of the AED 104, background noise levels derived from audio features extracted from the preamble and/or hotword 160, and the image data 20 indicating that the user 102 and the other individual 107 are likely participants in the video call 150 that will ensue with the recipient 103. A contextual input 202 may further indicate that semantic interpretation performed on a recognition result of the utterance 156 did not identify any explicit instruction to activate voice filtering.

Based on the received voice command 168 instructing the AED 104 to facilitate the video call 150 with the recipient Bob 103, the AED 104 may initiate the video call 150 by first establishing a connection via the network 132 with the recipient device 105 associated with the recipient 103. Thereafter, the AED 104 leaves the microphone 16 open and receives a second instance of the raw audio data corresponding to an utterance 176 of audible contents 178 for the video call 150 spoken by the user and captured by the AED 104. In the example shown, the utterance 176 of audible contents 178 includes "Hi Uncle Bob." The second instance of the raw audio data also captures additional sounds not spoken by the user 102, such as background noise 179 and an additional utterance 180 spoken by the other individual 107 that includes the audible contents "We miss you" following the audible contents 178 "Hi Uncle Bob". While recognized as an additional sound not spoken by the user 102, the additional utterance 180 is spoken by the other individual 107 who is indicated by the image data 20 as a likely participant of the voice call, and thus contains audible contents intended for the recipient 103 to hear. Accordingly, when executing the routine 200 results in the classification model 210 generating a classification result 212 that indicates to activate voice filtering for the voices of the user 102 and the other individual 107, the voice filtering engine 300 will apply voice filtering to generate enhanced audio data 152 that excludes the background noise 179 and isolates the voices of the user 102 and the other individual 107 in the video call 150.

While described in greater detail below with reference to FIG. 3, when the routine 200 determines to activate voice filtering for the voices of the user 102 and the other individual 107, the AED 104 (or server 120) instructs the voice filtering engine 300 to obtain a respective speaker embedding 318 (FIG. 3) for each of one of the user 102 and the other individual 107. The respective speaker embedding 318 for the user 102 may be obtained by processing audio features of the first instance of the raw audio data (e.g., the hotword 160) to generate a verification embedding and matching it to a stored speaker embedding 318. If no stored speaker embedding 318 is available (e.g., the user 102 is not enrolled with the AED 104), the respective speaker embedding 318 serving as the verification embedding can be used directly for applying voice filtering on the voice of the user 102 in subsequent speech. The respective speaker embedding 318 for the individual 107, and optionally the user 102, may be obtained by identifying the individual 107 based on the image data 20 through facial recognition when the individual is an enrolled user of the AED. Optionally, a facial image for the individual 107 may be extracted from the image data 20 and the speaker embedding 318 may be resolved by extracting audio features from audio synchronized with lips of the individual moving in the extracted facial image. The voice filtering engine 300 uses the respective speaker embeddings 318 to process the second instance of the raw audio data to generate the enhanced audio data 152 for the video call 150 that isolates the utterance 176 (spoken by the user 102) and the additional utterance 180 (spoken by the other individual 107) and excludes the background noise 179. Accordingly, in combination with the image data 20, the AED 104 (or the server 120) may transmit the enhanced audio data 152 to the recipient device 105 of the recipient 103 during the video call 150. The recipient device 105 may audibly output the enhanced audio data 152 to allow the recipient 103 to hear the utterance 178 "Hi Uncle Bob" spoken by the user 102 and the additional utterance 180 "We miss you" spoken by the other individual (e.g., the user's daughter) 107 without hearing the background noise 179 that was originally captured in the environment of the AED 104.

With continued reference to FIG. 2, the voice filtering recognition routine 200 may execute continuously such that the classification model 210 continuously updates the classification result 212 based on the contextual inputs 202. In doing so, the routine 200 may dynamically adjust for which voices voice filtering is active during an on-going audio-based communication session between the AED 104 and the recipient device 105. For example, the classification model 210 may initially generate a classification result 212 indicative of activating voice filtering for only the voice of the user 102, such that the voice filter engine 300 generates enhanced audio data 152 that isolates only the voice of the user and excludes all other sounds not spoken by the user. However, upon receiving the second instance of the raw audio data conveying the audible contents of the audio message, the ASR 116 through speech recognition and semantic interpretation may indicate that a speech recognition result for the audible contents identify at least one other individual participating in the audio-based communication 150. In one example, an utterance of audible contents may include the user 102 speaking "Hi Bob, it's me and Alex", whereby recognition of the utterance and subsequent semantic interpretation can identify that, in addition to the user, Alex is also a participant of the audio-based communication 150. Thus, the classification model 210 may receive a contextual input 202 that the user 102 and Alex are participants and generate an updated classification result 212 that activates voice filtering for the voices of the user 102 and Alex. Without this update based on the contextual input 202, any utterances spoken by Alex would be excluded from the audio-based communication even though those utterances likely contain audible content intended for the recipient 103 to listen to. In some examples, during a current voice-based communication thread/session, the voice filtering recognition routine 200 simply determines to re-activate voice filtering on the same voice(s) in a current outgoing audio-based communication that was activated for a previous audio-based communication.

Executing the voice filtering recognition routine 200 may include executing the classification model 210 as a heuristically-based model or a trained machine learning model. In some implementations, when the classification model 210 is a trained machine learning model, the trained machine learning model is re-trained/tuned to adaptively learn how to activate voice filtering for particular contextual inputs 202 based on user feedback 215 received after the voice filter engine 300 applies voice filtering on an audio-based communication based on the classification result 212 generated by the model 210 for the same particular contextual inputs 202. Here, the user feedback 215 may indicate acceptance of the voices voice filtering was active for or may indicate a subsequent user input indication indicating an adjustment to which voices the voice filtering was active for. For example, if voice filtering was applied to isolate only the voice of the user the user may provide a user input indication indicating that the user does not want specific voices and/or other sounds not spoken by the user to be isolated from the audio-based communication. As such, the AED 104 may execute a training process that continuously retains the machine learning classification model 210 based on the contextual inputs 202, associated classification results 212, and the obtained user feedback 215 so that the classification model 210 adaptively learns to output voice filtering classification results 212 personalized for the user 102 based on past user behavior/reaction in similar contexts.

Figure 3:
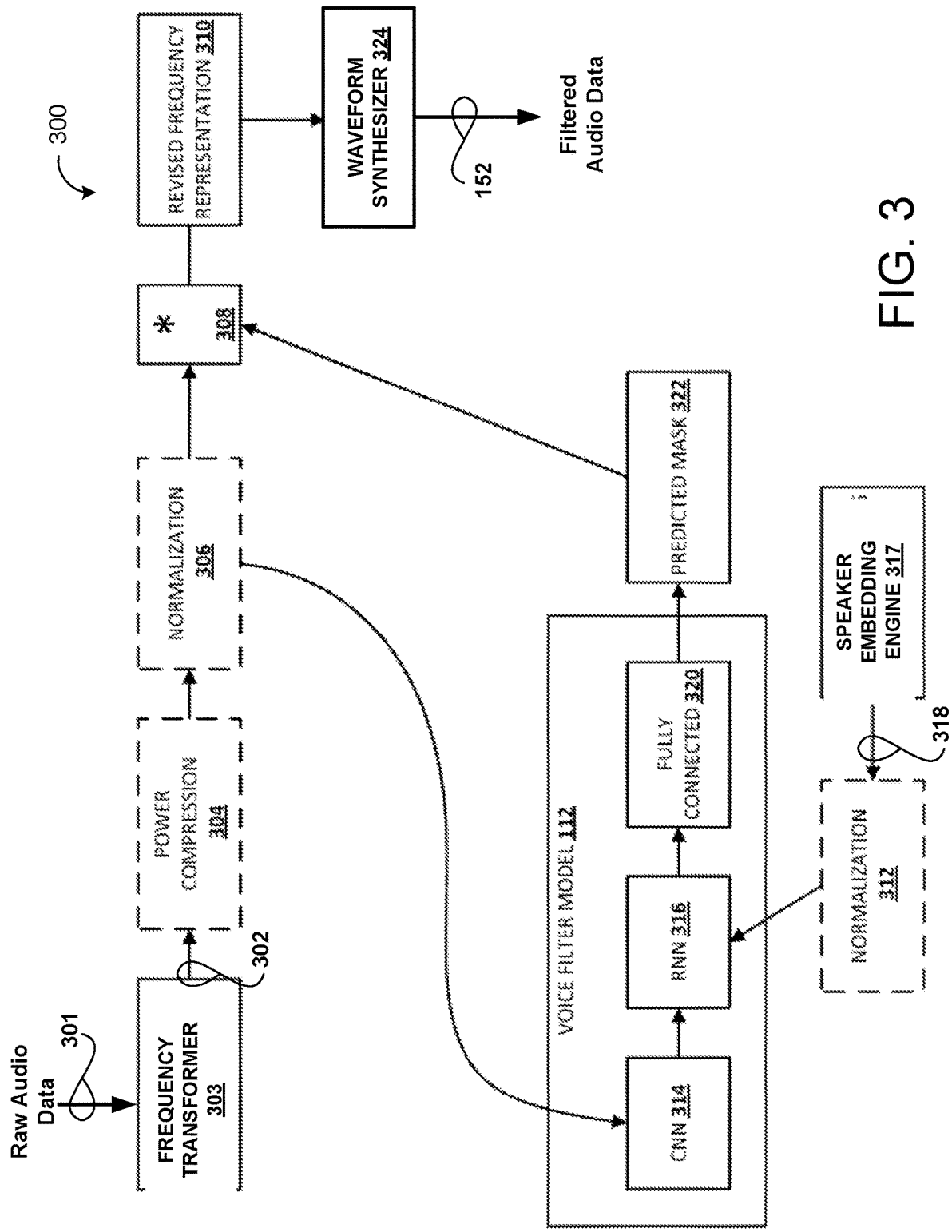
FIG. 3 is an example voice filtering engine that includes a voice filtering model for generating enhanced audio data.

Referring now to FIG. 3, when the voice filtering recognition routine 200 determines to activate voice filtering for at least the voice of the user 102, the voice filter engine 300 can use a frequency transformer 303 (which may be implemented at the ASR 116) to generate a frequency representation 302 for the received raw audio data 301 captured by the AED 104. Here, the raw audio data 301 may include one or more utterances of the audible content for an audio-based communication. The frequency representation 302 can be, for example, streaming audio data that is processed in an online manner (e.g., in real-time or in near real-time such as in a phone or video call) or non-streaming audio data that has been previously recorded (e.g., such as in an audio message) and provided to the voice filter engine. The voice filter engine also receives a speaker embedding 318 from a speaker embedding engine 317.

The speaker embedding 318 is an embedding for a given human speaker, and can be obtained based on processing one or more instances of audio data, from the given speaker, using a speaker embedding model. As described herein, in some implementations, the speaker embedding 318 is previously generated by the speaker embedding engine based on previous instance(s) of audio data from the given speaker. In some of those implementations, the speaker embedding 318 is associated with an account of the given speaker and/or a client device of the given speaker, and the speaker embedding 318 can be provided for utilization with the frequency representation 302 based on the frequency representation 302 coming from the AED 104 where the account has been authorized. The speaker embedding engine 317 can determine a respective speaker embedding 318 representing voice characteristics for each of one or more human speakers identified by the routine 200 for activating voice filtering. In some implementations, the speaker embedding engine 317 processes portion(s) of the captured raw audio data 301 using a speaker embedding model (not depicted) to generate the speaker embedding. Additionally or alternatively, speaker embedding engine 317 can select a pre-generated speaker embedding (e.g., a speaker embedding previously generated using an enrollment process) using voice fingerprinting, image recognition, a passcode, and/or other verification techniques to determine the human speaker currently active and, as a result, the speaker embedding for the currently active human speaker. In many implementations, a normalization engine 312 normalizes each of the one or more selected speaker embeddings 318.

The voice filter engine 300 may optionally process the frequency representation 302 using a power compression process to generate power compression 304. In many implementations, the power compression process equalize (or partially equalize) the importance of quieter sounds relative to loud sounds in the audio data. Additionally or alternatively, the voice filter engine 300 may optionally process frequency representation 302 using a normalization process to generate normalization 306, and may optionally process speaker embedding 318 using the normalization process to generate normalization 312.

The voice filter engine 300 may include a voice filter model 112 trained to process a frequency representation 302 of raw audio data 301 as well as a speaker embedding 318 corresponding to a human speaker to generate a predicted mask 322, where the frequency representation can be processed with the predicted mask 322 to generate a revised frequency representation 310 isolating utterance(s) of the human speaker. In lieu of using the predicted mask 322, other types of voice filtering models 112 are possible without departing from the scope of the present disclosure. For instance, an end-to-end voice filter model or a generative adversarial network (GAN)-based (model may directly produce the filtered spectrograms.

More specifically, the frequency representation 302 can be applied as input to a convolutional neural network (CNN) portion 314 of the voice filter model 112. In some implementations, the CNN portion 314 is a one-dimensional convolutional neural network. In many implementations, convolutional output generated by the CNN portion 314, as well as speaker embedding 318, is applied as input to a recurrent neural network (RNN) portion 316 of voice filter model 112. Here, the RNN portion 316 can include unidirectional memory units (e.g., long short term memory units (LSTM), gated recurrent units (GRU), and/or additional memory unit(s)). Additionally or alternatively, RNN output generated by the RNN portion 316 can be applied as input to a fully connected feed-forward neural network portion 320 of voice filter model 112 to generate the predicted mask 322. In some examples, the CNN portion 314 is omitted and both the frequency representation 302 and the speaker embedding 318 are applied as input to the RNN 316.

The engine 300 may process the frequency representation 302 with the predicted mask 322 to generate the revised frequency representation 310. For example, frequency representation 302 can be convolved 308 with predicted mask 322 to generate the revised frequency representation 310. A waveform synthesizer 324 may apply an inverse frequency transformation on the revised frequency representation 310 to generate the enhanced audio data 152 isolating the utterance(s) of the human speaker for playback. The enhanced audio data 152 can: be the same as the raw audio data 301 when the raw audio data 301 captures only utterance(s) from the speaker corresponding to the speaker embedding 318; be null/zero when the raw audio data 301 lacks utterances from the speaker corresponding to the speaker embedding 318; or exclude additional sound(s) while isolating utterance(s) from the speaker corresponding to the speaker embedding 318, when the raw audio data 301 includes utterance(s) from the speaker and additional sound(s) (e.g., overlapping utterance(s) of other human speaker(s) and/or additional background noise).

Figure 4:
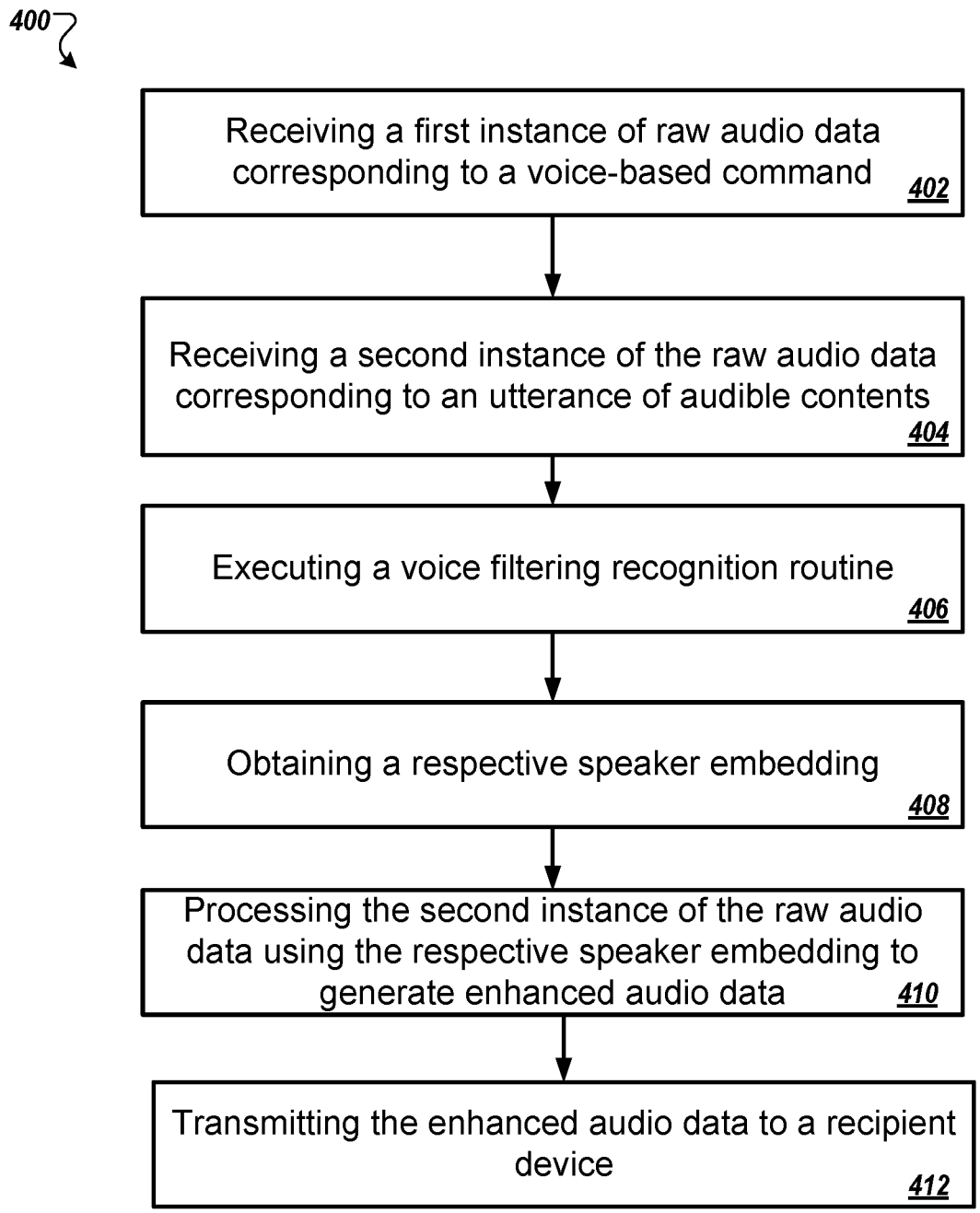
FIG. 4 is a flowchart of an example arrangement of operations for a method of activating voice filtering in audio-based communications.

FIG. 4 provides a flowchart of an example method 400 for activating voice filtering to focus on at least a voice of a user 102 in an audio-based communication 150. At operation 402, the method 400 includes receiving a first instance of raw audio data corresponding to a voice-based command 118 for an assistant-enabled device 104 to facilitate an audio-based communication 150 between a user 102 of the assistant-enabled device 104 and a recipient 103. The voice-based command 118 is spoken by the user 102 and captured by the assistant-enabled device 104.

At operation 404, the method 400 includes receiving a second instance of the raw audio data corresponding to an utterance 124 of audible contents 126 for the audio-based communication 150 spoken by the user 102 and captured by the assistant-enabled device 104. The second instance of the raw audio data captures one or more additional sounds that are not spoken by the user 102.

At operation 406, the method 400 includes executing a voice filtering recognition routine 200 to determine whether to activate voice filtering for at least a voice of the user 102 in the audio-based communication 150 based on the first instance of the raw audio data. At operation 408, when the voice filtering recognition routine determines to activate voice filtering for at least the voice of the user, the method 400 also includes obtaining a respective speaker embedding 318 of the user 102 that represents voice characteristics for the user. At operation 410, the method 400 includes processing, using the speaker embedding 318, the second instance of the raw audio data to generate enhanced audio data 152 for the audio-based communication 150 that isolates the utterance of the audible contents spoken by the user 102 and excludes at least a portion of the one or more additional sounds that are not spoken by the user.

At operation 412, the method 400 includes transmitting the enhanced audio data 152 to a recipient device 105 associated with the recipient 103. The enhanced audio data 152 when received by the recipient device 105, causing the recipient device 105 to audibly output the utterance 124 of the audible contents 126 spoken by the user 102.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
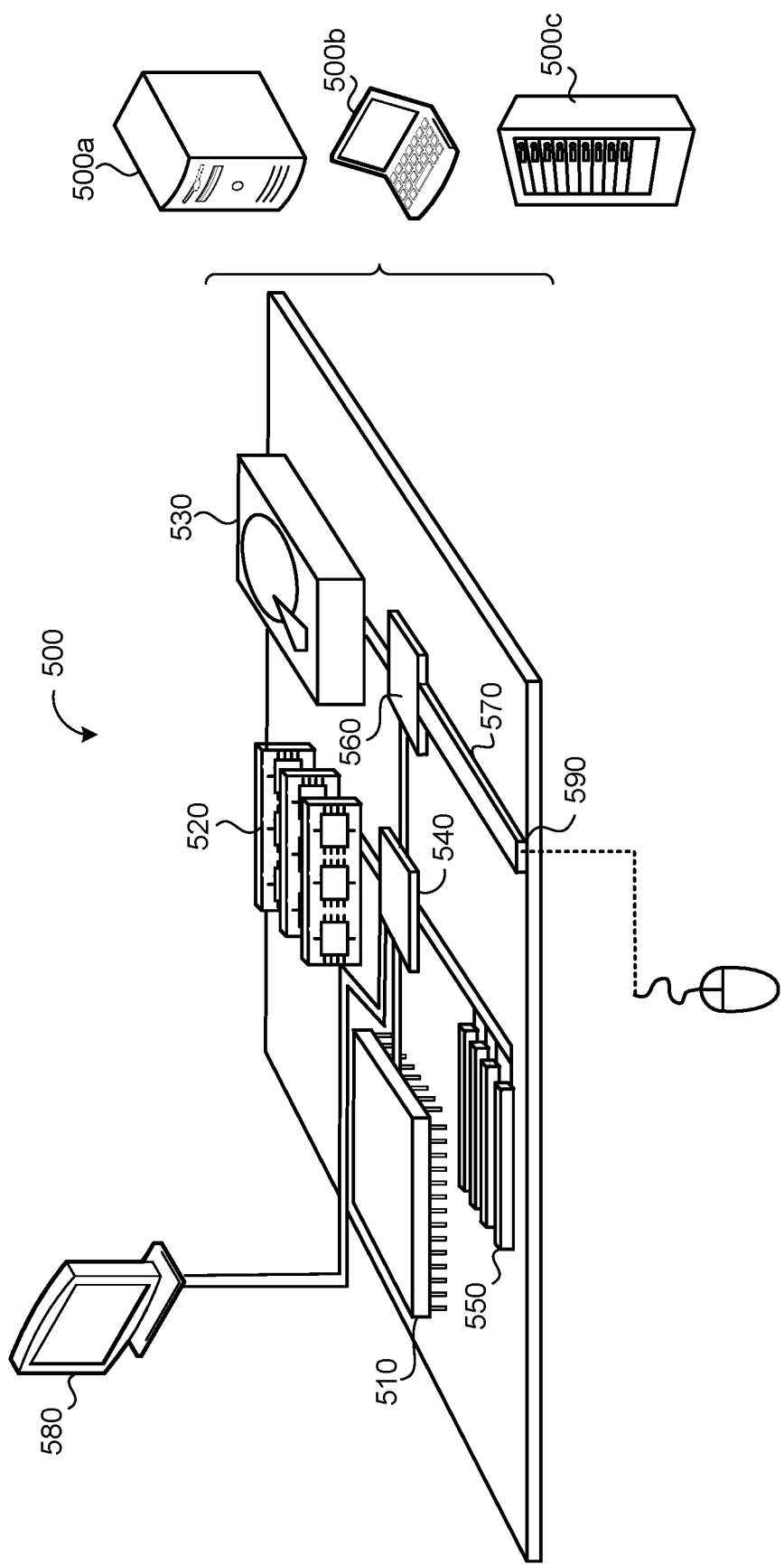
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
  receiving raw audio data corresponding to an utterance of audible contents spoken by a user and captured by an assistant-enabled device, the raw audio data capturing one or more additional sounds that are not spoken by the user;
  receiving, from an image capture device in communication with the data processing hardware, image data capturing the user while speaking the utterance of the audible contents;
  extracting, from the image data, a facial image for the user;
  extracting, from the raw audio data, audio features synchronized with lips of the user moving in the extracted facial image; and
  processing, using the extracted audio features, the raw audio data to generate enhanced audio data that isolates the utterance of the audible contents spoken by the user and excludes at least a portion of the one or more additional sounds that are not spoken by the user.

2. The computer-implemented method of claim 1, wherein the operations further comprise transmitting the enhanced audio data in an audio-based communication to a recipient device associated with a recipient of the audio-based communication, the enhanced audio data when received by the recipient device, causing the recipient device to audibly output the utterance of the audible contents spoken by the user.

3. The computer-implemented method of claim 2, wherein the operations further comprise:
  executing a voice filtering recognition routine to determine to activate voice filtering for a voice of the user in the audio-based communication based on the raw audio data,
  wherein processing the raw audio data to generate the enhanced audio data is based on determining to activate voice filtering for the voice of the user.

4. The computer-implemented method of claim 3, wherein executing the voice filtering recognition routine to determine to activate the voice filtering for the voice of the user comprises
  identifying the recipient of the audio-based communication;
  determining that the identified recipient of the audio-based communication comprises a particular recipient type indicating that activating the voice filtering for the voice of the user in the audio-based communication is appropriate; and
  based on determining that the identified recipient of the audio-based communication comprises the particular recipient type, determining to activate voice filtering for at least the voice of the user.

5. The computer-implemented method of claim 4, wherein the recipient type comprises a business.

6. The computer-implemented method of claim 1, wherein the operations further comprise:
  receiving initial audio data corresponding to a voice-based command for the assistant-enabled device to facilitate an audio-based communication between the user of the assistant-enabled device and a recipient, the voice-based command spoken by the user and captured by the assistant-enabled device;
  processing using a speech recognizer, the initial audio data to generate a speech recognition result; and
  performing semantic interpretation on the speech recognition result for the initial audio data to determine that the initial audio data comprises the voice-based command to facilitate the audio-based communication between the user and the recipient, wherein the utterance of the audible contents spoken by the user is for the audio-based communication spoken.

7. The computer-implemented method of claim 6, wherein the operations further comprise:
determining, based on the semantic interpretation performed on the speech recognition result for the initial audio data, that the voice-based command comprises an explicit instruction to activate voice filtering for the voice of the user,
wherein processing the raw audio data to generate the enhanced audio data is based on determining that the voice-based command comprises the explicit instruction to activate voice filtering.

8. The computer-implemented method of claim 1, wherein the raw audio data comprises preamble audio and a hotword preceding the utterance of the audible contents.

9. The computer-implemented method of claim 8, wherein the operations further comprise:
extracting audio features from the preamble audio and/or the hotword to determine a background noise level of an environment of the assistant-enabled device,
wherein processing the raw audio data to generate the enhanced audio data is based on the background noise level of the environment of the assistant-enabled device.

10. The computer-implemented method of claim 1, wherein the operations further comprise displaying, in a graphical user interface (GUI) displayed on a screen in communication with the data processing hardware:
a graphical indicator indicating whether or not voice filtering is currently activated for the voice of the user; and
a control for activating/deactivating voice filtering for the voice of the user.

11. A system comprising:
data processing hardware; and
memory hardware in communication with the data processing hardware, the memory hardware storing instructions that when executed on the data processing hardware cause the data processing hardware to perform operations comprising:
receiving raw audio data corresponding to an utterance of audible contents spoken by a user and captured by an assistant-enabled device, the raw audio data capturing one or more additional sounds that are not spoken by the user;
receiving, from an image capture device in communication with the data processing hardware, image data capturing the user while speaking the utterance of the audible contents;
extracting, from the image data, a facial image for the user;
extracting, from the raw audio data, audio features synchronized with lips of the user moving in the extracted facial image; and
processing, using the extracted audio features, the raw audio data to generate enhanced audio data that isolates the utterance of the audible contents spoken by the user and excludes at least a portion of the one or more additional sounds that are not spoken by the user.

12. The system of claim 11, wherein the operations further comprise transmitting the enhanced audio data in an audio-based communication to a recipient device associated with a recipient of the audio-based communication, the enhanced audio data when received by the recipient device, causing the recipient device to audibly output the utterance of the audible contents spoken by the user.

13. The system of claim 12, wherein the operations further comprise:
executing a voice filtering recognition routine to determine to activate voice filtering for a voice of the user in the audio-based communication based on the raw audio data,
wherein processing the raw audio data to generate the enhanced audio data is based on determining to activate voice filtering for the voice of the user.

14. The system of claim 13, wherein executing the voice filtering recognition routine to determine to activate the voice filtering for the voice of the user comprises
identifying the recipient of the audio-based communication;
determining that the identified recipient of the audio-based communication comprises a particular recipient type indicating that activating the voice filtering for the voice of the user in the audio-based communication is appropriate; and
based on determining that the identified recipient of the audio-based communication comprises the particular recipient type, determining to activate voice filtering for at least the voice of the user.

15. The system of claim 14, wherein the recipient type comprises a business.

16. The system of claim 11, wherein the operations further comprise:
receiving initial audio data corresponding to a voice-based command for the assistant-enabled device to facilitate an audio-based communication between the user of the assistant-enabled device and a recipient, the voice-based command spoken by the user and captured by the assistant-enabled device;
processing using a speech recognizer, the initial audio data to generate a speech recognition result; and
performing semantic interpretation on the speech recognition result for the initial audio data to determine that the initial audio data comprises the voice-based command to facilitate the audio-based communication between the user and the recipient,
wherein the utterance of the audible contents spoken by the user is for the audio-based communication spoken.

17. The system of claim 16, wherein the operations further comprise:
determining, based on the semantic interpretation performed on the speech recognition result for the initial audio data, that the voice-based command comprises an explicit instruction to activate voice filtering for the voice of the user,
wherein processing the raw audio data to generate the enhanced audio data is based on determining that the voice-based command comprises the explicit instruction to activate voice filtering.

18. The system of claim 11, wherein the raw audio data comprises preamble audio and a hotword preceding the utterance of the audible contents.

19. The system of claim 18, wherein the operations further comprise:
extracting audio features from the preamble audio and/or the hotword to determine a background noise level of an environment of the assistant-enabled device,
wherein processing the raw audio data to generate the enhanced audio data is based on the background noise level of the environment of the assistant-enabled device.

20. The system of claim 11, wherein the operations further comprise displaying, in a graphical user interface (GUI) displayed on a screen in communication with the data processing hardware:
- a graphical indicator indicating whether or not voice filtering is currently activated for the voice of the user; and
- a control for activating/deactivating voice filtering for the voice of the user.

* * * * *